Oct. 6, 1970  R. C. HUGHES ET AL  3,532,429
MULTICHANNEL ATOMIC ABSORPTION SPECTROMETER
Filed June 7, 1967
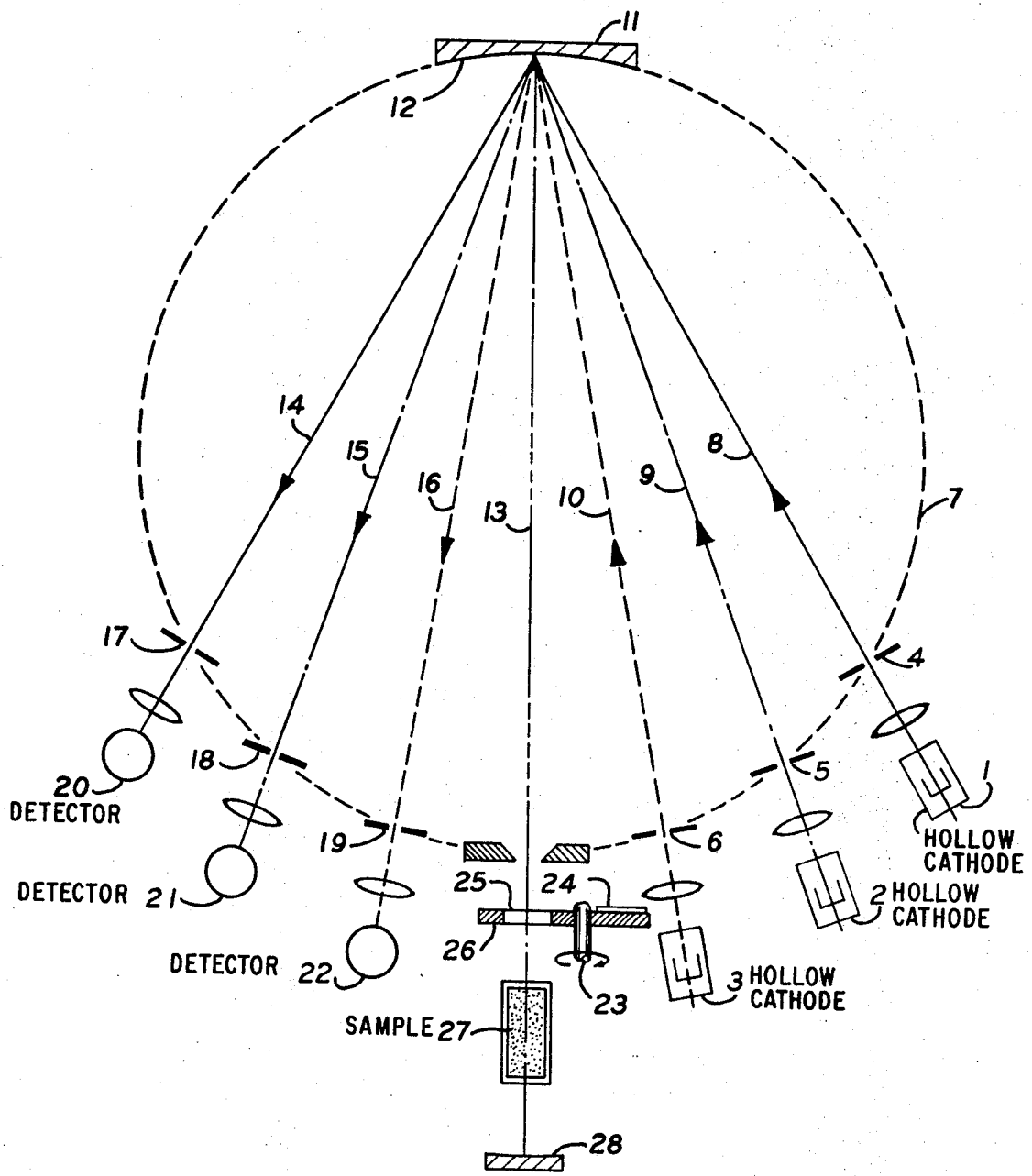
INVENTORS
RAY C. HUGHES
RADU MAVRODINEANU
BY
AGENT

United States Patent Office 3,532,429
Patented Oct. 6, 1970

3,532,429
MULTICHANNEL ATOMIC ABSORPTION SPECTROMETER
Ray C. Hughes and Radu Mavrodineanu, Ossining, N.Y., assignors, by mesne assignments, to U.S. Philips Corporation, New York, N.Y., a corporation of Delaware
Continuation-in-part of application Ser. No. 555,472, June 6, 1966. This application June 7, 1967, Ser. No. 644,273
Int. Cl. G01j 3/20, 3/42
U.S. Cl. 356—95                  3 Claims

ABSTRACT OF THE DISCLOSURE

A multichannel absorption spectrometer employing a diffraction grating to combine a plurality of primary radiations into a common beam for absorption by a sample and to split the combined beam after absorption into a plurality of beams.

---

This application is a continuation-in-part of application Ser. No. 555,472, filed June 6, 1966, now Pat. 3,472,594.

The invention relates to a multichannel absorption spectrometer for simultaneously determining the presence of two or more elements by atomic absorption.

In copending application Ser. No. 555,472 a multichannel absorption spectrometer is disclosed which employs a dispersing element in the form of a prism or grating which receives radiation from two or more sources and combines the radiations from the respective sources into a common beam. After passing through the sample, the common beam is allowed to impinge upon a further dispersing element which splits the beam into its constituent elements, each of which then impinges upon its respective detector. In the device described in that application, the detectors are located on the same side of the dispersing element so that the returning beams must be reflected in the same direction as the beams from the sources which requires accurate alignment of the sources, the dispersing element and the detectors relative to the specimen.

It is an object of the invention to simplify the construction of a multichannel absorption spectrometer.

Further objects of the invention will appear as the specification progresses.

In accordance with the invention radiations from two or more sources of radiation are combined into a common beam by a dispersing element constituted by a grating. This common beam is then permitted to traverse a vapor sample where the elements constituting the sample each absorb the respective radiations differently. After traversing the sample, the beam is reflected by a mirror back through the sample onto the dispersing element which splits the common beam into its constituents each of which are reflected to a detector on the side opposite that of the source.

The invention will be described with reference to the accompanying drawing, the sole figure of which shows an absorption spectrometer according to the invention.

A plurality of hollow cathodes 1, 2, and 3 emitting respectively Fe, Cu, and Mg radiations are positioned in front of slits 4, 5, and 6 located on the circumference of a Rowland Circle 7. The slits limit the divergence of the beams of radiation from the respective sources thus effectively locating the source on the Rowland circle. Beams of radiation 8, 9, and 10 from each of the cathodes passes through the slits and is intercepted by a diffraction grating 11 whose surface 12 has a radius of curvature corresponding to that of the Rowland circle. Radiations from the cathodes are combined into a common beam 13 which passes through an opening 25 in an apertured disc 26 rotated by shaft 23 and a driving motor (not shown) and is then absorbed by a sample 27 in a vapor state. Characteristic radiations in passing through the vaporized analytical sample are partially absorbed in proportion to the relative abundance of the absorbing atoms present.

The absorbed beam is reflected by mirror 28 and again traverses the sample and after emerging from the sample passes through the aperture in the disc and impinges upon grating 11 where it is split up into constituent beams 14, 15 and 16 corresponding to those from each of the cathodes and reflected to the side opposite the cathodes. Each of the constituent reflected beams pass through slits 17, 18 and 19 located on the circumference of the Rowland circle and are received by detectors 20, 21 and 22 respectively located behind those slits. These slits also effectively locate the detectors in the circumference of the Rowland circle.

For comparison in making a measurement, the light chopper is provided with a mirror 24 which reflects an unabsorbed beam of radiation. By comparing the intensity of the reflected absorbed beams with those reflected but not absorbed, a quantitative determination of the presence of an element is easily made.

While the invention has been described with reference to a particular embodiment and application thereof, other modifications will be readily apparent to those skilled in the art without departing from the spirit and scope of the invention which is defined in the appended claims.

What is claimed is:

1. A multichannel atomic absorption spectrometer for simultaneously determining the presence of a plurality of elements in an analytical sample while in a vapor state comprising a sample chamber containing said analytical sample located exterior to a Rowland circle and along an extended diameter thereof, means to generate a plurality of separate beams of radiation of different wavelengths each corresponding to an absorption line of one of said elements in the analytical sample effectively located in spaced relationship along the circumference of said circle on one side of said sample chamber, means for directing said beams along converging paths, a dispersing element positioned on the circumference of said circle to receive and combine the separate beams of radiation into a common beam of radiation for traversing the sample chamber, means to alternately return the common beam onto said dispersing element before and after traversing the sample to thereby separate said common beam into separate diverging beams of radiation, each of which corresponds to an absorption line of one of said elements in said sample, and means to detect each of said separate beams of radiation both before and after traversing the sample effectively located on the circumference of said circle on the opposite side of said sample chamber.

2. A multichannel atomic absorption spectrometer as claimed in claim 1 in which said means to generate and said means to detect are positioned behind slits located on the circumference of said circle.

3. A multichannel atomic absorption spectrometer as claimed in claim 2 in which an apertured reflecting disc is interposed between the sample chamber and the dispersing element and means to rotate the disc are provided in order to alternately permit radiation to traverse the sample and be reflected without traversing the sample.

References Cited

UNITED STATES PATENTS

| | | | |
|---|---|---|---|
| 3,052,154 | 9/1962 | Bolz | 356—99 X |
| 2,847,899 | 8/1958 | Walsh | 356—95 |
| 3,137,758 | 6/1964 | Mason et al. | 356—95 |
| 3,386,331 | 6/1968 | Keller. | |

FOREIGN PATENTS 1,389,897  1/1965  France.

RONALD L. WIBERT, Primary Examiner

F. L. EVANS, Assistant Examiner

U.S. Cl. X.R.

350—162; 356—85, 97, 98